(12) United States Patent
Dinan

(10) Patent No.: US 9,332,479 B2
(45) Date of Patent: May 3, 2016

(54) NETWORK SITE FOR WIRELESS COMMUNICATIONS

(71) Applicant: Esmael Hejazi Dinan, Herndon, VA (US)

(72) Inventor: Esmael Hejazi Dinan, Herndon, VA (US)

(73) Assignee: Ofinno Technologies, LLC, Herndon, VA (US)

( * ) Notice: Subject to any disclaimer, the term of this patent is extended or adjusted under 35 U.S.C. 154(b) by 532 days.

(21) Appl. No.: 13/734,754

(22) Filed: Jan. 4, 2013

(65) Prior Publication Data

US 2013/0170435 A1   Jul. 4, 2013

Related U.S. Application Data

(60) Provisional application No. 61/582,854, filed on Jan. 4, 2012.

(51) Int. Cl.
*H04W 40/00* (2009.01)
*H04L 12/723* (2013.01)
*H04L 5/00* (2006.01)

(52) U.S. Cl.
CPC ............... *H04W 40/00* (2013.01); *H04L 45/50* (2013.01); *H04L 5/001* (2013.01)

(58) Field of Classification Search
CPC ........ H04W 40/00; H04L 45/50; H04L 5/001
USPC ......................................................... 370/328
See application file for complete search history.

(56) References Cited

U.S. PATENT DOCUMENTS

2007/0201469 A1*  8/2007  Iyer .................. H04L 29/12028
                                                       370/391

OTHER PUBLICATIONS

A. Awduche, L. Berger, D. Gan, T. Li, V. Srinivasan, and G. Swallow. RSVP-TE: extensions to RSVP for LSP Tunnels, IETF RFC 3209, Dec. 2001.
Bocci, M., S. Bryant, D. Frost, L. Levrau, and L. Berger. A framework for MPLS in transport networks. IETF RFC 5921. 2010.
Socolofsky, Theodore J., and Claudia J. Kale. TCP/IP tutorial. IETF RFC 1180. 1991.
Schulzrinne, Henning, Stephen Casner, Ron Frederick, and Van Jacobson. RTP: A transport protocol for real-time applications. IETF RFC 3550. 2003.
Huitema, Christian. "Real time control protocol (RTCP) attribute in session description protocol (SDP)." (2003).
Fielding, Roy, Jim Gettys, Jeffrey Mogul, Henrik Frystyk, Larry Masinter, Paul Leach, and Tim Berners-Lee. Hypertext transfer protocol—HTTP/1.1. IETF RFC 2616. 1999.
Gundavelli, Sri, Kent Leung, Vijay Devarapalli, Kuntal Chowdhury, and Basavaraj Patil. Proxy mobile ipv6. IETF RFC 5213. 2008.

(Continued)

*Primary Examiner* — Christopher R Crompton
*Assistant Examiner* — Ellen A Kirillova
(74) *Attorney, Agent, or Firm* — Esmael Dinan; David Grossman

(57) ABSTRACT

A wireless network site comprises a base station and a cell site gateway. The cell site gateway comprises a first interface connected to the base station, a second interface connected to a packet network gateway, a label forwarding layer, and a third interface connected to a signaling peer to exchange control plane information to program the forwarding layer. The label forwarding layer transmits and receive packets. The control plane information comprises at least one first label value for transmitting a first plurality of packets to the base station and at least one second label value for transmitting a second plurality of packets to the packet network gateway.

20 Claims, 7 Drawing Sheets

(56) References Cited

OTHER PUBLICATIONS

"3GPP TS 29.281 V8.0.0: General Packet Radio System (GPRS) Tunnelling Protocol User Plane (GTPv1-U) (Release 8)" Technical Specification Group Core Network and Terminals, Dec. 2008. 3rd Generation Partnership Project.

D. Awduche, J. Malcolm, J. Agogbua, M. O'Dell, J. McManus. Requirements for Traffic Engineering Over MPLS. IETF RFC 2702. 1999.

Mannie, Eric. "Generalized multi-protocol label switching (GMPLS) architecture." IETF RFC 3494, Oct. 2004.

Bluetooth SIG, Specification of the Bluetooth system, Bluetooth Core Specification Addendum 1, Jun. 26, 2008.

Andersson, Loa, Ina Minei, and Bob Thomas. LDP specification. IETF RFC 5036. Oct. 2007.

R. Braden, L. Zhang, S. Berson, S. Herzog, and S. Jamin. "Resource ReSerVation Protocol (RSVP)—Version 1 Functional Specification." IETF RFC 2205, Sep. 1997.

Lang, Jonathan P. "Link management protocol (LMP)." IETF RFC 4204, Oct. 2005.

"3GPP TS 36.300 V10.4.0: Evolved Universal Terrestrial Radio Access (E-UTRA) and Evolved Universal Terrestrial Radio Access Network (E-UTRAN); Overall description; Stage 2 (Release 10)" Technical Specification Group Radio Access Network, Jun. 2011. 3rd Generation Partnership Project.

J. Moy. "OSPF Version 2." IETF RFC 2328, Apr. 1998.

OpenFlow Switch Specification Version 1.1.0 Implemented (Wire Protocol 0x02). Feb. 28, 2011.

"3GPP TS 36.300 V9.7.0: Evolved Universal Terrestrial Radio Access (E-UTRA) and Evolved Universal Terrestrial Radio Access Network (E-UTRAN); Overall description; Stage 2 (Release 9)" Technical Specification Group Radio Access Network, Mar. 2011. 3rd Generation Partnership Project.

EN 300 749-V1.1.2-1997-08. Digital Video Broadcasting (DVB)—Microwave Multipoint Distribution Systems (MMDS) below 10 GHz (Foreign Standard). European Telecommunications Standards Institute, Aug. 2011.

IEEE Std., "Wireless LAN Medium Access Control (MAC) and Physical Layer (PHY) specifications: Amendment 5: Enhancements for Higher Throughput," IEEE Std. 802.11n-2009, The IEEE Standards Association, New York, NY, USA, Oct. 2009.

IEEE Std., "Local and metropolitan area networks: Part 16: Air Interface for Broadband Wireless Access Systems," IEEE Std. 802.16/2009, The IEEE Standards Association, New York, NY, USA, May 2009.

* cited by examiner

US 9,332,479 B2

NETWORK SITE FOR WIRELESS COMMUNICATIONS

CROSS-REFERENCE TO RELATED APPLICATIONS

This application claims the benefit of U.S. Provisional Application No. 61/582,854, filed Jan. 4, 2012, entitled "Network Site for Wireless Communications," which is hereby incorporated by reference in its entirety.

BRIEF DESCRIPTION OF THE SEVERAL VIEWS OF THE DRAWINGS

An exemplary embodiment of the present invention is described herein with reference to the drawings, in which.

DETAILED DESCRIPTION OF EMBODIMENTS

The technology disclosed herein is in the technical field of wireless communication systems. More particularly, the technology disclosed herein is related to a method and system for communications in a base station site for enhancing data traffic transmission employing label forwarding. Embodiments of the present invention provide a method and system for network site in a wireless communication network.

Figure 1:
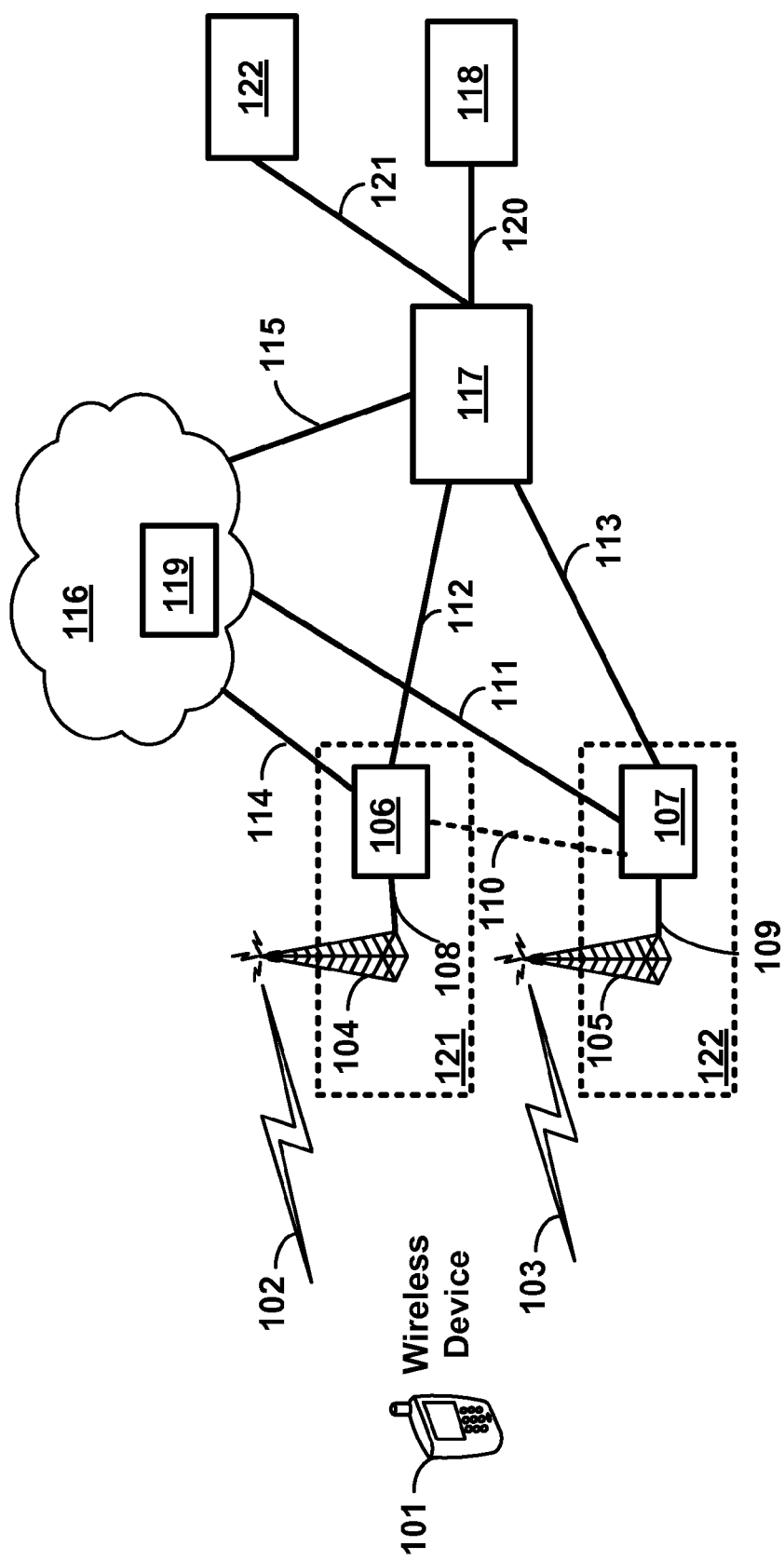
FIG. 1 is a simplified block diagram depicting a communication system for transmitting and receiving packets to and from a wireless device, according to an exemplary embodiment.

FIG. 1 is a simplified block diagram depicting a communication system for transmitting and receiving packets to and from a wireless device 101 according to an exemplary embodiment. This simplified block diagram depicts a system for transmitting data traffic generated by a wireless device 101 to a cellular network gateway 118 over radio interface, for example employing a multicarrier OFDM radio according to one aspect of the illustrative embodiments. As shown, the system includes at its core a packet network gateway 117, which may function to provide connectivity among one or more cell sites 121, 122 and a cellular network gateway 118 and a cellular network signaling node 122. Base stations provide services to wireless devices 101 (e.g., a cell phone, PDA, or other wirelessly-equipped device), and may connect them to one or more servers, such as multimedia server, application servers, email servers, or database servers, or may connect them to other wireless devices. The packet network gateway may also be connected via interface 121 to a signaling node 122. Signaling node 122 may provide signaling information to base stations and wireless devices.

A cell site may include one or more than one base stations connected to a cell site gateway. Base stations in a site may communicate to each other via the cell site gateway. A base station 105 in cell site 122 may communicate with another base station 104 in cell site 121 employing cell site gateways 106 and 107. In such a scenario, cell site gateway 106 and cell site gateway 107 may be connected via interface 110 to enable communication between base station 105 and base station 104. In another example, the cell site gateway 106 and cell site 107 may be connected via interfaces 112 and 113 and packet network gateway 117. Any of the above options may be adopted depending on the operator's preference and network architecture.

It should be understood, however, that this and other arrangements described herein are set forth for purposes of example only. As such, those skilled in the art will appreciate that other arrangements and other elements (e.g., machines, interfaces, functions, orders of functions, etc.) can be used instead, some elements may be added, and some elements may be omitted altogether. Further, as in most telecommunications applications, those skilled in the art will appreciate that many of the elements described herein are functional entities that may be implemented as discrete or distributed components or in conjunction with other components, and in any suitable combination and location. Still further, various functions described herein as being performed by one or more entities may be carried out by hardware, firmware and/or software logic. For instance, various functions may be carried out by a processor executing a set of machine language instructions stored in memory.

As shown, the access network may include a plurality of base stations 104, 105. Each base station of the access network may function to transmit and receive RF radiation 102, 103 at one or more carrier frequencies, and the RF radiation may then provide one or more air interfaces over which the wireless device 101 may communicate with the base stations 104, 105. The user 101 may use the wireless device to receive data traffic, such as one or more multimedia files, data files, pictures, video files, or voice mails, etc. The wireless device 101 may include applications such as web email, email applications, upload and ftp applications, MMS applications, or file sharing applications. In another example embodiment, the wireless device 101 may automatically send traffic to another wireless device or a server in the network without direct involvement of a user. For example, consider a wireless camera with automatic upload feature, or a video camera uploading videos to the remote server, or a personal computer equipped with an application transmitting traffic to a remote server.

Each of the one or more base stations 104, 105 may define a corresponding wireless coverage area. The RF radiation 102, 103 of the base stations may carry communications between the Wireless Cellular Network/Internet Network and access device 101 according to any of a variety of protocols. For example, RF radiation 102, 103 may carry communications according to WiMAX (e.g., IEEE 802.16), LTE, LTE-Advanced, microwave, satellite, MMDS, Wi-Fi (e.g., IEEE 802.11), Bluetooth, infrared, and other protocols now known or later developed. The communication between the wireless device 101 and other wireless devices or a server may be enabled by any networking and transport technology for example TCP/IP, RTP, RTCP, HTTP or any other networking protocol.

In an example embodiment, an LTE or LTE-Advanced network includes many base stations 104, 105, providing a user plane (PDCP/RLC/MAC/PHY) and control plane (RRC) protocol terminations towards the wireless device 101. The base stations may be interconnected with each other by means of the X2 interface 110. In another embodiment, X2 interface may be provided by interfaces 112, 113 and gateway 117. Any other digital medium may be used to enable X2 interface. The base stations may also be connected by means of the S1 interface to the EPC (Evolved Packet Core), more specifically to the MME (Mobility Management Entity) 122 by means of the S1-MME interface and to the Serving Gateway (S-GW) 118 by means of the S1-U interface. The S1 interface may support a many-to-many relation between MMEs/Serving Gateways and base stations. An S-GW may be connected to one or more PDN gateways. MME, S-GW, and P-GW are functional nodes and may or may not be combined to physical nodes. For example, S-GW and P-GW may be combined in a physical node, or MME and S-GW may be combined in a physical node, or MME, P-GW, and S-GW may be all combined in a physical node.

A base station may include many sectors for example 2, 3, 4, or 6 sectors. A base station may include many cells. A cell may be categorized as a primary cell or secondary cell. When carrier aggregation is configured, a wireless device may have one RRC connection with the network. At RRC connection establishment/re-establishment/handover, one serving cell provides the NAS (non-access stratum) mobility information (e.g. TAI), and at RRC connection re-establishment/handover, one serving cell provides the security input. This cell is referred to as the Primary Cell (PCell). In the downlink, the carrier corresponding to the PCell is the Downlink Primary Component Carrier (DL PCC) while in the uplink it is the Uplink Primary Component Carrier (UL PCC). Depending on wireless device capabilities, Secondary Cells (SCells) may be configured to form together with the PCell a set of serving cells. In the downlink, the carrier corresponding to an SCell is a Downlink Secondary Component Carrier (DL SCC) while in the uplink it is an Uplink Secondary Component Carrier (UL SCC). An SCell may or may not have an uplink carrier.

Packet routing and transfer functions are performed in a cellular network. A route may be an ordered list of nodes used for the transfer of packets within and between the PLMN(s). Each route may include of the originating node, zero or more relay nodes and the destination node. Routing is the process of determining and employing, in accordance with a set of rules, the route for transmission of a message within and between the PLMN(s). The EPS (Evolved Packet System) may be an IP network and may use routing and transport mechanisms of the underlying IP network. The Maximum Transfer Unit (MTU) size may also be applicable to EPS. The IP header compression function may be implemented to reduce the use of radio capacity by IP header compression mechanisms. The packet screening function may provide the network with the capability to check that the wireless device is employing the proper IPv4-Address and/or IPv6-Prefix that is assigned to the UE (wireless device).

The mobility management functions are used to keep track of the current location of a UE. Radio resource management functions are concerned with the allocation and maintenance of radio communication paths, and may be performed by the radio access network. The RRM strategy in E-UTRAN (evolved universal terrestrial radio access network) may be based on user specific information. To support radio resource management in E-UTRAN the MME (mobility management entity) may provide some of the radio resource management related parameters to an eNodeB across S1 interface. S1 interface is the interface between an eNodeB and an MME.

An EPS network includes E-UTRAN. E-UTRAN functions may include at least one of the following functions: Header compression and user plane ciphering; MME selection when no routing to an MME can be determined from the information provided by the UE; UL bearer level rate enforcement based on UE-AMBR and MBR via means of uplink scheduling (e.g. by limiting the amount of UL resources granted per UE over time); DL bearer level rate enforcement based on UE-AMBR; UL and DL bearer level admission control; Transport level packet marking in the uplink, e.g. setting the DiffServ Code Point, based on the QCI of the associated EPS bearer; ECN-based congestion control.

EPS may also include at least one MME. MME functions include at least one or many of the following: NAS signalling; NAS signalling security; Inter CN node signalling for mobility between 3GPP access networks (terminating S3); UE Reachability in ECM-IDLE state (including control and execution of paging retransmission); Tracking Area list management; Mapping from UE location (e.g. TAI) to time zone, and signalling a UE time zone change associated with mobility, PDN GW and Serving GW selection; MME selection for handovers with MME change; SGSN selection for handovers to 2G or 3G 3GPP access networks; Roaming (S6a towards home HSS); Authentication; Authorization; Bearer management functions including dedicated bearer establishment; Lawful Interception of signalling traffic; Warning message transfer function (including selection of appropriate eNodeB); UE Reachability procedures; Support Relaying function (RN Attach/Detach). The Serving GW and the MME may be implemented in one physical node or separated physical nodes.

EPS may include two logical Gateways including Serving GW (S-GW) and PDN GW (P-GW). The PDN GW and the Serving GW may be implemented in one physical node or separated physical nodes.

The Serving GW is the gateway which may terminate the interface towards E-UTRAN. For each UE associated with the EPS, at a given point of time, there may be a Serving GW. The functions of the Serving GW, for both the GTP-based and the PMIP-based S5/S8, may include at least one of the following: the local Mobility Anchor point for inter-eNodeB handover; sending of one or more "end marker" to the source eNodeB, source SGSN or source RNC immediately after switching the path during inter-eNodeB and inter-RAT handover, especially to assist the reordering function in eNodeB; Mobility anchoring for inter-3GPP mobility (terminating S4 and relaying the traffic between 2G/3G system and PDN GW); ECM-IDLE mode downlink packet buffering and initiation of network triggered service request procedure; Lawful Interception; Packet routing and forwarding; Transport level packet marking in the uplink and the downlink, e.g. setting the DiffServ Code Point, based on the QCI of the associated EPS bearer; Accounting for inter-operator charging. For GTP-based S5/S8, the Serving GW generates accounting data per UE and bearer.

The PDN GW is the gateway which may terminate the SGi interface towards the PDN. If a UE is accessing multiple PDNs, there may be more than one PDN GW for that UE, however a mix of S5/S8 connectivity and Gn/Gp connectivity is not supported for that UE simultaneously. PDN GW functions include for both the GTP-based and the PMIP-based S5/S8 at least one of the following: Per-user based packet filtering (by e.g. deep packet inspection), Lawful Interception; UE IP address allocation; Transport level packet marking in the uplink and downlink, e.g. setting the DiffServ Code Point, based on the QCI of the associated EPS bearer; Accounting for inter-operator charging; UL and DL service level charging (e.g. based on SDFs defined by the PCRF, or based on deep packet inspection defined by local policy); Interfacing OFCS through according to charging principles and through reference points; UL and DL service level gating control; UL and DL service level rate enforcement (e.g. by rate policing/shaping per SDF); UL and DL rate enforcement based on APN-AMBR (e.g. by rate policing/shaping per aggregate of traffic of all SDFs of the same APN that are associated with Non-GBR QCIs); DL rate enforcement based on the accumulated MBRs of the aggregate of SDFs with the same GBR QCI (e.g. by rate policing/shaping); DHCPv4 (server and client) and DHCPv6 (client and server) functions; The network does not support PPP bearer type in this version of the specification. Pre-Release 8 PPP functionality of a GGSN may be implemented in the PDN GW; packet screening. Additionally the PDN GW may include at least one of the following functions for the GTP-based S5/S8: UL and DL bearer binding; UL bearer binding verification; Accounting per UE and bearer.

The PDN GW selection function allocates a PDN GW that may provide the PDN connectivity for the 3GPP access. The function may use subscriber information provided by the HSS and possibly additional criteria. The criteria for PDN GW selection may include load balancing between PDN GWs. When the PDN GW IP addresses returned from a DNS server include Weight Factors, the MME may use it if load balancing is required. The Weight Factor may be set according to the capacity of a PDN GW node relative to other PDN GW nodes serving the same APN.

The PDN subscription contexts provided by the HSS may comprise at least one of: a) the identity of a PDN GW and an APN (PDN subscription contexts with subscribed PDN GW address are not used when there is interoperation with pre Rel-8 2G/3G SGSN), b) an APN and an indication for this APN whether the allocation of a PDN GW from the visited PLMN is allowed or whether a PDN GW from the home PLMN may be allocated. Optionally an identity of a PDN GW may be contained for handover with non-3GPP accesses, c) optionally for an APN, an indication of whether SIPTO (Selected IP Traffic Offload) is allowed or prohibited for this APN.

In the case of static address allocation, a static PDN GW may be selected by either having the APN configured to map to a given PDN GW, or the PDN GW identity provided by the HSS indicates the static PDN GW. The HSS may indicate which of the PDN subscription contexts is the default one for the UE. To establish connectivity with a PDN when the UE is already connected to one or more PDNs, the UE may provide the requested APN for the PDN GW selection function.

If one of the PDN subscription contexts provided by the HSS contains a wild card APN, a PDN connection with dynamic address allocation may be established towards any APN requested by the UE. An indication that SIPTO is allowed or prohibited for the wild card APN may allow or prohibit SIPTO for any APN that is not present in the subscription data.

If the HSS provides the identity of a statically allocated PDN GW, or the HSS provides the identity of a dynamically allocated PDN GW and the Request Type indicates "Handover", no further PDN GW selection functionality may be performed. If the HSS provides the identity of a dynamically allocated PDN GW, the HSS may provide information that identifies the PLMN in which the PDN GW is located.

If the HSS provides the identity of a dynamically allocated PDN GW and the Request Type indicates "initial Request", either the provided PDN GW may be used or a new PDN GW may be selected. When a PDN connection for an APN with SIPTO permissions is requested, the PDN GW selection function may ensure the selection of a PDN GW that is appropriate for the UE's location. The PDN GW identity refers to a specific PDN GW. If the PDN GW identity includes the IP address of the PDN GW, that IP address may be used as the PDN GW IP address; otherwise the PDN GW identity may include an FQDN which is used to derive the PDN GW IP address by employing Domain Name Service function, taking into account the protocol type on S5/S8 (PMIP or GTP).

If the HSS provides a PDN subscription context that allows for allocation of a PDN GW from the visited PLMN for this APN, the PDN GW selection function may derive a PDN GW identity from the visited PLMN. If a visited PDN GW identity cannot be derived, or if the subscription does not allow for allocation of a PDN GW from the visited PLMN, then the APN may be used to derive a PDN GW identity from the HPLMN. The PDN GW identity is derived from the APN, subscription data and additional information by employing the Domain Name Service function. If the PDN GW identity is a logical name instead of an IP address, the PDN GW address is derived from the PDN GW identity, protocol type on S5/S8 (PMIP or GTP) by employing the Domain Name Service function. The S8 protocol type (PMIP or GTP) may be configured per HPLMN in MME/SGSN.

In order to select the appropriate PDN GW for SIPTO service, the PDN GW selection function uses the TAI (Tracking Area Identity), the serving eNodeB identifier, or TAI together with serving eNodeB identifier depending on the operator's deployment during the DNS interrogation to find the PDN GW identity. In roaming scenario PDN GW selection for SIPTO may be possible when a PDN GW in the visited PLMN is selected. Therefore in a roaming scenario with home routed traffic, PDN GW selection for SIPTO may not be performed.

The PDN GW domain name may be constructed and resolved by a method, which takes into account any value received in the APN-OI Replacement field for home routed traffic. If the Domain Name Service function provides a list of PDN GW addresses, one PDN GW address may be selected from this list. If the selected PDN GW cannot be used, e.g. due to an error, then another PDN GW may be selected from the list. The specific interaction between the MME/SGSN and the Domain Name Service function may include functionality to allow for the retrieval or provision of additional information regarding the PDN GW capabilities (e.g. whether the PDN GW supports PMIP-based or GTP-based S5/S8, or both).

If the UE provides an APN for a PDN, this APN may then be used to derive the PDN GW identity as specified for the case of HSS provided APN if one of the subscription contexts allows for this APN. If there is an existing PDN connection to the same APN used to derive the PDN GW address, the same PDN GW may be be selected. As part of PDN GW selection, an IP address of the assigned PDN GW may be provided to the UE for use with host based mobility, if the PDN GW supports host-based mobility for inter-access mobility towards accesses where host-based mobility may be used. If a UE explicitly requests the address of the PDN GW and the PDN GW supports host based mobility then the PDN GW address may be returned to the UE.

The Serving GW selection function may select an available Serving GW to serve a UE. The selection bases on network topology, i.e. the selected Serving GW serves the UE's location and for overlapping Serving GW service areas, the selection may prefer Serving GWs with service areas that reduce the probability of changing the Serving GW. When SIPTO is allowed then it is also considered as a criterion for Serving GW selection, e.g. when the first PDN connection is requested. Other criteria for Serving GW selection may include load balancing between Serving GWs. When the Serving GW IP addresses returned from the DNS server include Weight Factors, the MME may use it if load balancing is required. The Weight Factor is typically set according to the capacity of a Serving GW node relative to other Serving GW nodes serving the same Tracking area.

If a subscriber of a GTP network roams into a PMIP network, the PDN GWs selected for local breakout support the PMIP protocol, while PDN GWs for home routed traffic use GTP. This means the Serving GW selected for such subscribers may need to support both GTP and PMIP, so that it is possible to set up both local breakout and home routed sessions for these subscribers. For a Serving GW supporting both GTP and PMIP, the MME/SGSN may indicate the Serving GW which protocol may be used over S5/S8 interface. The MME/SGSN is configured with the S8 variant(s) on a per HPLMN granularity.

If a subscriber of a GTP network roams into a PMIP network, the PDN GWs selected for local breakout may support GTP or the subscriber may not be allowed to use PDN GWs of the visited network. In both cases a GTP based Serving GW may be selected. These cases are considered as roaming between GTP based operators.

If combined Serving and PDN GWs are configured in the network the Serving GW Selection Function preferably derives a Serving GW that is also a PDN GW for the UE.

The Domain Name Service function may be used to resolve a DNS string into a list of possible Serving GW addresses which serve the UE's location. The specific interaction between the MME/SGSN and the Domain Name Service function may include functionality to allow for the retrieval or provision of additional information regarding the Serving GW capabilities (e.g. whether the Serving GW supports PMIP-based or GTP-based S5/S8, or both). The details of the selection are implementation specific.

The MME selection function selects an available MME for serving a UE. The selection may be based on network topology, i.e. the selected MME serves the UE's location and for overlapping MME service areas, the selection may prefer MMEs with service areas that reduce the probability of changing the MME. When a MME/SGSN selects a target MME, the selection function performs a simple load balancing between the possible target MMEs.

When an eNodeB selects an MME, the eNodeB may use a selection function which distinguishes if the GUMMEI is mapped from P-TMSI/RAI or is a native GUMMEI. The indication of mapped or native GUMMEI may be signalled by the UE to the eNodeB as an explicit indication. The eNodeB may differentiate between a GUMMEI mapped from P-TMSI/RAI and a native GUMMEI based on the indication signalled by the UE. Alternatively, the differentiation between a GUMMEI mapped from P-TMSI/RAI and a native GUMMEI may be performed based on the value of most significant bit of the MME Group ID, for PLMNs that deploy such mechanism. In this case, if the MSB is set to "0" then the GUMMEI is mapped from P-TMSI/RAI and if MSB is set to "1", the GUMMEI is a native one. Alternatively the eNodeB may make the selection of MME based on the GUMMEI without distinguishing on mapped or native. When an eNodeB selects an MME, the selection may achieve load balancing.

An eNodeB may connect to several MMEs. This may imply that an eNodeB may be able to determine which of the MMEs, covering the area where an UE is located, may receive the signalling sent from a UE. To avoid unnecessary signalling in the core network, a UE that has attached to one MME should generally continue to be served by this MME as long as the UE is in the radio coverage of the pool area to which the MME is associated. The concept of pool area is a RAN based definition that comprises one or more TA(s) that, from a RAN perspective, are served by a certain group of MMEs. This does not exclude that one or more of the MMEs in this group serve TAs outside the pool area. This group of MMEs may also referred to as an MME pool.

To enable the eNodeB to determine which MME to select when forwarding messages from an UE, this functionality may define a routing mechanism (and other related mechanism). A routing mechanism (and other related mechanism) is defined for the MMEs. The routing mechanism is required to find the correct old MME (from the multiple MMEs that are associated with a pool area). When a UE roams out of the pool area and into the area of one or more MMEs that do not know about the internal structure of the pool area where the UE roamed from, the new MME will send the Identification Request message or the Context Request message to the old MME employing the GUTI. The routing mechanism in both the MMEs and the eNodeB utilises the fact that every MME that serves a pool area must have its own unique value range of the GUTI parameter within the pool area.

X2 interface may be used for handover signalling and data forwarding between two eNodeBs. X2 interface connects two eNodeBs. X2 interface may be established between two eNodeBs in two cell sites. X2 interface may be established employing cell site gateways. An LSP may be established from a cell site gateway in a wireless site to another cell site gateway in another network site. Upon handover from a source eNodeB to a destination eNodeB (eNB), the source eNB may forward in order to the target eNB all downlink PDCP SDUs with their SN (sequence number) that have not been acknowledged by the UE. In addition, the source eNB may also forward without a PDCP SN fresh data arriving over S1 to the target eNB. The target eNB may not have to wait for the completion of forwarding from the source eNB before it begins transmitting packets to the UE. This may be enabled packet transfer employing label switched path established between two cell site gateways. A cell site gateway may establish an LSP to another cell site gateway to carry X2 signalling and data traffic. The cell site gateway may also establish an LSP to packet network gateway to carry S1 signaling and data traffic.

The source eNB may discard any remaining downlink RLC PDUs. Correspondingly, the source eNB does not forward the downlink RLC context to the target eNB. The source eNB may not need to abort on going RLC (radio link control) transmissions with the UE as it starts data forwarding to the target eNB.

Upon handover, the source eNB may forward to the Serving Gateway the uplink PDCP SDUs successfully received in-sequence until the sending of the Status Transfer message to the target eNB. Then at that point of time the source eNB may stop delivering uplink PDCP SDUs to the S-GW and may discard any remaining uplink RLC PDUs. Correspondingly, the source eNB may not forward the uplink RLC context to the target eNB.

Then the source eNB may either: a) discard the uplink PDCP SDUs received out of sequence if the source eNB has not accepted the request from the target eNB for uplink forwarding or if the target eNB has not requested uplink forwarding for the bearer during the Handover Preparation procedure, or b) forward to the target eNB the uplink PDCP SDUs received out of sequence if the source eNB has accepted the request from the target eNB for uplink forwarding for the bearer during the Handover Preparation procedure.

For normal HO in-sequence delivery of upper layer PDUs during handover may be based on a continuous PDCP SN and is provided by the in-order delivery and duplicate elimination function at the PDCP layer: a) in the downlink, the "in-order delivery and duplicate elimination" function at the UE PDCP layer may maintain in-sequence delivery of downlink PDCP SDUs; b) in the uplink, the "in-order delivery and duplicate elimination" function at the target eNB PDCP layer may maintain in-sequence delivery of uplink PDCP SDUs.

After a normal handover, when the UE receives a PDCP SDU from the target eNB, it may deliver it to higher layer together with all PDCP SDUs with lower SNs regardless of possible gaps. For handovers involving Full Configuration, the source eNB behavior is unchanged from the description above. The target eNB may not send PDCP SDUs for which delivery was attempted by the source eNB. The target eNB identifies these by the presence of the PDCP SN in the forwarded GTP-U packet and may discard them. After a Full Configuration handover, the UE may deliver received PDCP SDU from the source cell to the higher layer regardless of possible gaps. UE may discard uplink PDCP SDUs for which transmission was attempted and retransmission of these over the target cell is not possible.

Transport network may provide a reliable aggregation and transport infrastructure for any client traffic type. With the growth of packet-based services, operators may transform their network infrastructures while looking at reducing capital and operational expenditures. Multi-protocol label switching or transport profile of multi-protocol label switching may be implemented.

MPLS-TP may provide connection-oriented transport for packet and TDM services over optical networks leveraging the widely deployed MPLS technology. Generalized MPLS (GMPLS) is a generalization of the MPLS control plane to develop a dynamic control plane that may be applied to packet switched and optical networks. The GMPLS control plane may support connection management functions as well as protection and restoration techniques and thus providing network survivability across networks comprising routers, MPLS-TP LSRs, optical ADMs, cross connects, and WDM devices. MPLS-TP may utilize the distributed control plane to enable fast, dynamic and reliable service provisioning in multi-vendor and multi-domain environments employing standardized protocols that ensure interoperability.

A control plane is based on a combination of the MPLS control plane for pseudowires and the GMPLS control plane for MPLS-TP LSPs may be considered. A distributed MPLS-TP control plane may provide the following basic functions: Signaling, Routing, Traffic engineering and constraint-based path computation. Moreover, the MPLS-TP control plane may be capable of performing fast restoration in the event of network failures. The MPLS-TP control plane may provide features to ensure its own survivability and to enable it to recover gracefully from failures and degradations. These include graceful restart and hot redundant configurations. The MPLS-TP control plane is as much as possible decoupled from the MPLS-TP data plane such that failures in the control plane do not impact the data plane and vice versa. MPLS-TP is a set of MPLS protocols that are being defined in IETF. It is a simplified version of MPLS for transport networks with some of the MPLS functions turned off, such as Penultimate Hop Popping (PHP), Label-Switched Paths (LSPs) merge, and Equal Cost Multi Path (ECMP). MPLS-TP does not require MPLS control plane capabilities and enables the management plane to set up LSPs manually. Its OAM may operate without any IP layer functionalities.

The essential features of MPLS-TP are MPLS forwarding plane with restrictions, PWE3 Pseudowire architecture, Control Plane: static or dynamic Generalized MPLS (G-MPLS), Enhanced OAM functionality, OAM monitors and drives protection switching, Use of Generic Associated Channel (G-ACh) to support fault, configuration, accounting, performance, security (FCAPS) functions, and Multicasting. IP/MPLS may be scalable and can be deployed end-to-end to accommodate the needs of any network size.

In some cases, a service provider may not want to deploy a dynamic control plane based on IP protocols in some areas of the network. For example, the multiplication of Pseudowires (PWs) for some applications such as mobile backhaul may require IP addresses for the PWs. A static configuration of PWs may be considered. In addition, protection based on MPLS-Traffic Engineering (TE) may not be manageable in a situation where the complexity associated with a TE/Fast Reroute (FRR) setup to protect thousands of nodes/paths may be a challenge. MPLS-TP solution may allow static provisioning in the MPLS-TP domain. This approach may ease the transition from legacy transport technologies to an MPLS infrastructure. MPLS-TP and IP/MPLS may be integrated so that LSPs and PWs may be provisioned and managed smoothly, end-to-end.

Within the context of MPLS-TP, the control plane is the mechanism used to set up an LSP automatically across a packet-switched network domain. The use of a control plane protocol may be optional in MPLS-TP. Some operators may prefer to configure the LSPs and PWs employing a Network Management System in the same way that it may be used to provision a SONET network. In this case, no IP or routing protocol may be used. On the other hand, it is possible to use a dynamic control plane with MPLS-TP so that LSPs and PWs are set up by the network employing Generalized (G)-MPLS and Targeted Label Distribution Protocol (T-LDP) respectively. G-MPLS is based on the TE extensions to MPLS (MPLS-TE). It may also be used to set up the OAM function and define recovery mechanisms. T-LDP is part of the PW architecture and is widely used today to signal PWs and their status.

MPLS may be designed to carry Layer 3 IP traffic by establishing IP-based paths and associating these paths with arbitrarily assigned labels. These labels may either be configured explicitly by a network administrator or dynamically assigned by a protocol such as the Label Distribution Protocol (LDP) or Resource Reservation Protocol (RSVP). GMPLS may carry various types of Layer 1 through Layer 3 traffic. GMPLS labels and LSPs may be processed at four levels. The levels, for example, may be Fiber-Switched Capable (FSC), Lambda-Switched Capable (LSC), Time-Division Multiplexing Capable (TDM), and Packet-Switched Capable (PSC).

LSPs may start and end on links with the same switching capability. To send an LSP, a label-switched device may communicate with another device at the same layer of the Open System Interconnection (OSI) model. Thus, routers may set up PSC LSPs with other routers at Layer 3, and SONET/SDH add/drop multiplexers (ADMs) may establish TDM LSPs with other ADMs at Layer 1. A router PSC LSP may be carried over a TDM LSP, a TDM LSP may be carried over a wavelength LSC LSP, and so on.

This extension of the MPLS protocol may expand the number of devices that may participate in label switching. Lower layer devices, such as Ethernet switches, optical cross-connects (OXCs) and SONET/SDH ADMs, may now participate in GMPLS signaling and set up paths to transfer data. Additionally, routers may participate in signaling optical paths across a transport network. GMPLS labeling may be more flexible than MPLS. A GMPLS label may represent a TDM time slot, a Dense Wavelength Division Multiplexing (DWDM) wavelength (also known as a lambda), or a physical port number. The labels may be derived from physical components of the network devices, such as interfaces.

To enable multilayer LSPs, GMPLS may use the following mechanisms: a) Separation of the control channel from the data channel—A new protocol called Link Management Protocol (LMP) may be used to define and manage both control channels and data channels between GMPLS peers. Messages for GMPLS LSP setup are sent from one device to a peer device over an out-of-band control channel. Once the LSP setup is complete and the path is provisioned, the data channel may be established and may be used to carry traffic. In GMPLS, the control channel is always separate from the data channel. b) RSVP-TE extensions for GMPLS—RSVP-TE was designed to signal the setup of packet LSPs. The protocol has been extended to request path setup for non-packet LSPs that use wavelengths, time slots, and fibers as potential labels. C) OSPF extensions for GMPLS—OSPF was designed to route packets to physical and logical interfaces related to a PIC. This protocol has been extended to route packets to virtual peer interfaces defined in an LMP configuration. D) Bidirectional LSPs—Unlike unidirectional LSP paths found in the standard, packet-based version of MPLS, data may travel both ways between GMPLS devices over a single LSP path.

GMPLS is intended to bridge the gap between the traditional transport infrastructure and the IP layer. GMPLS may be designed to enable multivendor interoperability and multilayer functionality. Routers or switches may be able to make dynamic requests for extra bandwidth on demand from the optical network. Consequently, service providers may envision GMPLS as a means to set up optical circuits or label switched paths and services dynamically instead of manually.

In the example embodiments, cell site gateway may implement MPLS, MPLS-TP, or MPLS-TP along with GMPLS control plane. All options may be possible, and a service operator may implement one or many of these protocols. If MPLS is deployed, then the cell site gateway may use in-band signaling to establish a label switched path. For MPLS-TP, static or dynamic configuration option and LSP set up processes may be used. When MPLS-TP with GMPLS control plane is implemented, then GMPLS control plane may be used to implement network signaling and establish an LSP. When labels are configured in a network nodes and cell site gateway employing static or dynamic methods, then an LSP may be set up. Cell site gateway and network nodes may insert or remove labels on packets and forward packets along an LSP. Pseudo wires may be established to carry multiple types of traffic along LSPs. Additional labels may be implemented for example for identifying pseudo-wires. LSPs may be established between cell site gateway and packet network gateway, or LSPs may be established between cell site gateway directly or indirectly through packet network gateway or other network gateways/nodes.

Figure 2:
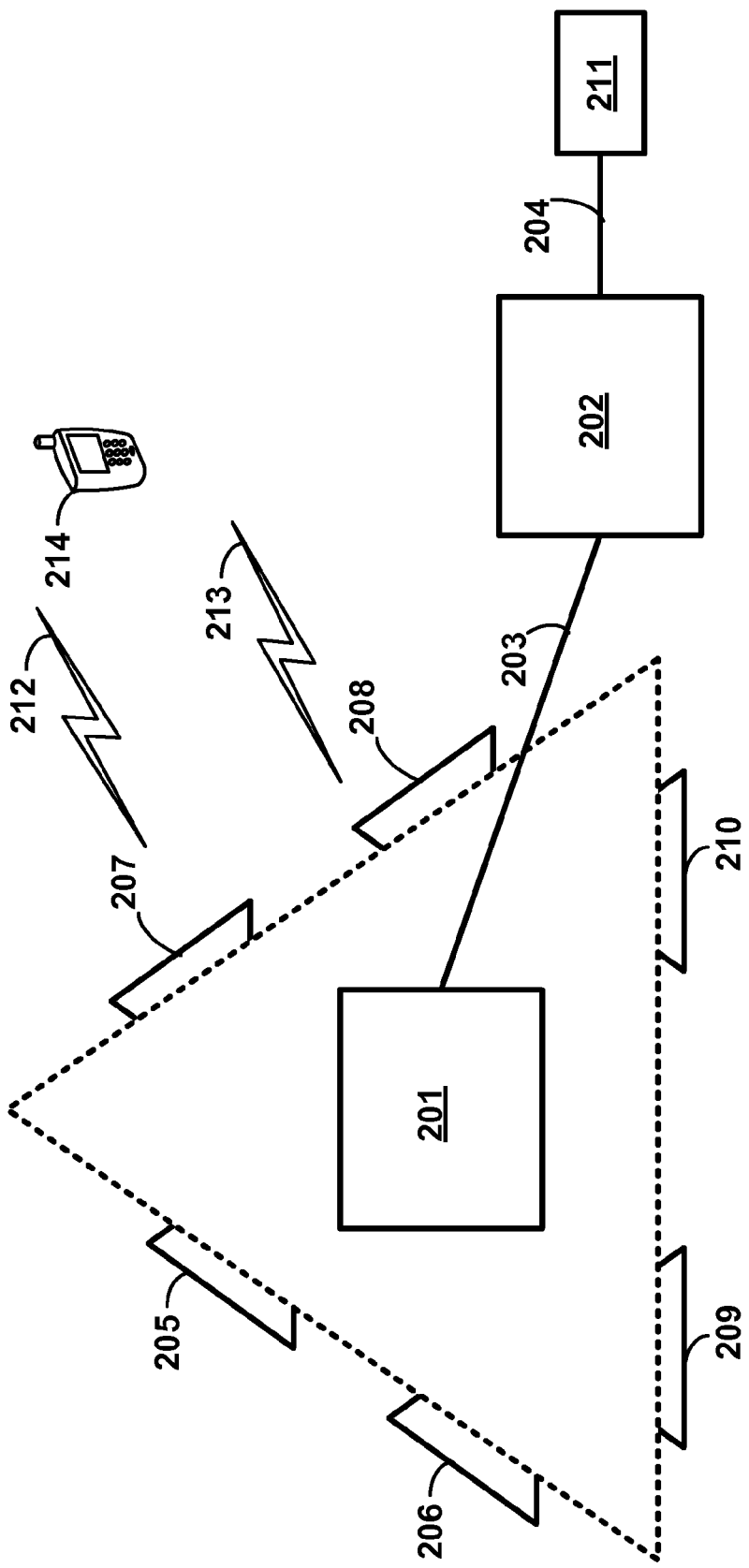
FIG. 2 is a diagram depicting a first example of a wireless network site according to an exemplary embodiment.

FIG. 1 is a simplified block diagram depicting a communication system for transmitting and receiving packets to and from a wireless device 101 according to an exemplary embodiment. FIG. 2 is a diagram depicting a first example of a wireless network site according to an exemplary embodiment. In an example embodiment, a wireless network site 121, 122 may comprise a first base station 104, 105, 201 and a cell site gateway 106, 107, 202. The first base station 201, 102, 103 may communicate employing a wireless technology with at least one wireless device 101 via air interface 102, 103. The wireless technology may use a protocol layer architecture comprising a physical layer. The physical layer may support simultaneous transmission employing a plurality of antennae in each sector of the first base station. For example, antennae 206 and 205 are in sector one, antennae 207 and 208 are in sector two, and antennae 209 and 210 are in sector three. As an example, in sector two antennae 207 and 208 may simultaneously transmit signals 212 and 213 to wireless device 214. Multiple antennae may be installed in a single antenna packaging or multiple antenna packaging.

The first base station 104, 105, 201 may communicate with a cellular network gateway 118 through the cell site gateway 106, 107, 202. The cell site gateway 106, 107, 202 may comprise a first interface 108, 109, 203, a second interface 112, 113, 204, a third interface 114, 111, and a label forwarding layer. The first interface 108, 109, 203 may be connected to the first base station. The second interface 108, 109, 203 may be connected to a packet network gateway 117, 211. The third interface 114, 111 may be connected to a signaling peer 119 to exchange control plane information to program a forwarding layer. The signaling peer may reside in the control plane network 116. The control plane information may comprise at least one first label and at least one second label value. The at least one first label value may be used for transmitting a first plurality of packets to the first base station. The at least one second label value may be used for transmitting a second plurality of packets to the packet network gateway. The signaling peer exchanges 119 the control plane information with the packet network gateway 117, 211 via interface 115. The label forwarding layer may transmit the second plurality of packets to the packet network gateway employing the second interface. The label forwarding layer may receive the first plurality of packets from the packet network gateway employing the second interface. The label forwarding layer may attach at least one of the at least one second label to the second plurality of packets. The label forwarding layer may remove at least one of the at least one first label from the first plurality of packets.

In an example implementation, the third interface may be integrated in the second interface. MPLS may be used as the control plane. Signaling protocols such as RSVP, LDP, or other signaling methods may be used to establish a label switched path between cell site gateway and packet network gateway to transfer S1 traffic and signaling, and label switched path may also be established between cell site gateways for exchange of traffic and signaling between base stations. Then signaling traffic may be exchanged on the second interface. Label switched paths may also be established statically employing a management platform to simplify network operation. In these implementations, label switching and label forwarding is used for packet transfer along a label switched path.

In another example embodiment, a wireless network site may comprise a first base station and a cell site gateway. The first base station may communicate employing a wireless technology with at least one wireless device. The wireless technology may use a protocol layer architecture comprising a physical layer supporting simultaneous transmission employing a plurality of antennae in each sector of the first base station. The first base station may communicate with at least one base station through a cell site gateway. The first base station may communicate with a cellular network gateway through the cell site gateway. The cell site gateway may comprise a first interface, a second interface, and a label forwarding layer. The first interface may be connected to the base station. The second interface may be connected to a packet network gateway. The third interface may be connected to a signaling peer to exchange control plane information to program a forwarding layer.

The control plane information comprise at least one first label value for transmitting a first plurality of packets to the first base station, at least one second label value for transmitting a second plurality of packets to the packet network gateway, and at least one parameter characterizing the second interface. The signaling peer may exchange the control plane information with the packet network gateway. The label forwarding layer may transmit the second plurality of packets to the packet network gateway employing the second interface. The label forwarding layer may receive the first plurality of packets from the packet network gateway employing the second interface. The label forwarding layer may attach at least one of the at least one second label to the second plurality of packets. The label forwarding layer may remove at least one of the at least one first label from the first plurality of packets.

The packet network gateway 117 is directly or indirectly connected to the cellular network gateway 118. The wireless network cell site may comprise at least one additional second base station connected to the cell site gateway. The wireless network cell site may comprise a plurality of base stations for example an LTE base station and an HSPA base station. The base stations in the cell site may receive and transmit packets to the cell site gateway.

The second plurality of packets may be transmitted to the packet network gateway 118 via at least one intermediate network node. The at least one first label and the at least one second label may comprise a label value, a class of service, and/or bottom of label stack flag. The cell site gateway 202 may comprise the second interface 204 link information. The second interface 204 link information may comprise of at least following information: link bandwidth information, shared risk link information, link protection type, and switching capability.

The signaling peer 119 is attached to the control plane for exchanging the control plane information with the cell site gateway 106, 107. The label forwarding layer may further comprise swapping label on a third plurality of packets. The cell site gateway may comprise of a path computation engine. The cell site gateway may exchange the control plane information employing RSVP-TE via the third interface. The cell site gateway may exchange the control plane information employing MPLS-TP. The cell site gateway may exchange the control plane information employing a label distribution mechanism via the third interface. The cell site gateway may comprise of routing functionality supporting a link state routing protocol. The link state routing protocol may be one of OSPF and IS-IS. The wireless technology may be LTE or LTE-Advanced technology. The wireless technology may be one of the following: 802.11 family of technologies, Bluetooth technology, and WiMAX technology.

The cellular network gateway may be an LTE Serving Gateway. The cellular network gateway may be connected to an LTE Serving Gateway. The cellular network gateway and the packet network gateway may be co-located or may be physically in the same network cabinet. The first base station may comprise a plurality of cells. The first base station may comprise a plurality of antennae. The first interface may be an Ethernet interface. The first base station may communicate with a cellular network gateway employing a backhaul interface. The cell site gateway may transmit the first plurality of packets to the first base station via the first interface. The cell site gateway may receive the second plurality of packets from the first base station via the first interface. The cell site gateway processes packet headers of the first plurality of packets and the second plurality of packets. The cell site gateway modifies packet headers of the first plurality of packets and the second plurality of packets. The first base station may process packet headers of the first plurality of packets and the second plurality of packets. The first base station may modify packet headers of the first plurality of packets and the second plurality of packets. Packets travel from the cellular network gateway to the wireless device and from the wireless device to cellular network gateway while passing through base station, cell site gateway, and packet network gateway. Each node may process packet headers and may update packet headers. Some of the nodes may also fragment or concatenate packets depending on the underlying layer 1 and layer 2 technologies.

The first base station may forward at least one of the first plurality packets received from the cell site gateway to one of the at least one base station during the handover procedure. The first base station may forward at least one of the first plurality of packets received from the cell site gateway to the cell site gateway during the handover procedure. The first base station may transmit at least one of the first plurality of packets to the at least one wireless device. The first base station may receive at least one of the second plurality of packets from the at least one wireless device. The first base station may comprise a plurality of sectors, and each sector in the plurality of sectors may comprise a plurality of antennas. The first base station may transmit at least one of the first plurality of packets to one of the at least one wireless device employing a plurality of antennas belonging to at least two sectors in the plurality of sectors. The first base station may receive at least one of the second plurality of packets from one of the at least one wireless device employing a plurality of antennas belonging to at least two sectors in the plurality of sectors. The cell site gateway communicates with the at least one base station. The cell site gateway may transmit a plurality of packets received from the first base station to the at least one base station. The cell site gateway may further comprise an interface for management functions. The cell site gateway may use the management interface for managing the device for provisioning and maintenance. The cell site gateway may use the management interface for connecting to the wireless network management network for operations, management and administration.

Figure 3:
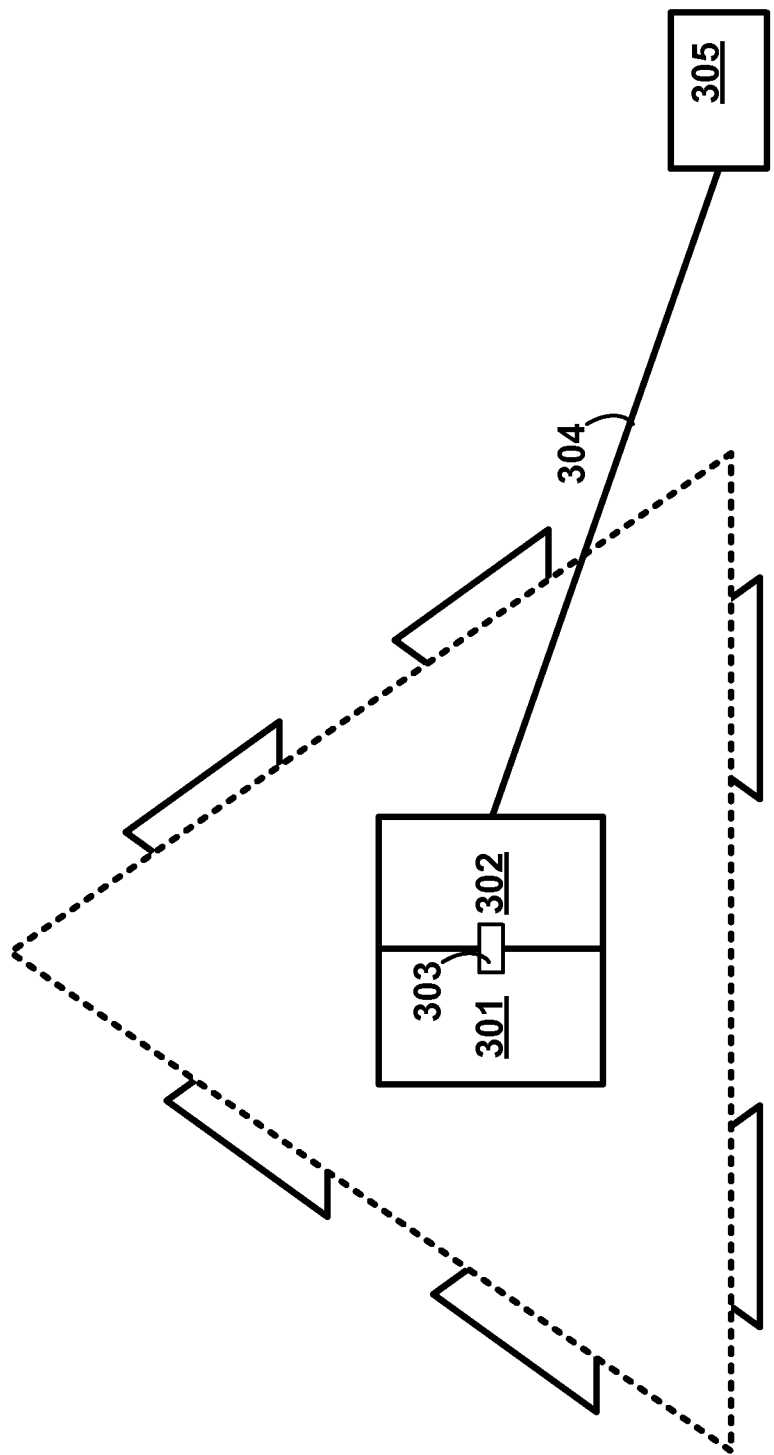
FIG. 3 is a diagram depicting a second example of a wireless network site according to an exemplary embodiment.

FIG. 3 is a diagram depicting a second example of a wireless network site according to an exemplary embodiment. In an example embodiment, the first base station 301 and the cell site gateway 302 may be located in the same physical location. The first base station 301 and the cell site gateway 302 may be interconnected via an internal interface 303. The cell site gateway 302 may be connected to the packet network gateway 305 via interface 304. In another example embodiment the first base station and the cell site gateway may be located in different physical locations. The different physical locations are connected to each other via digital links. For example, the base station may be located at the cell site, and the cell site gateway may be located in a POP (point of presence) or maybe located in an aggregation point. The cell site gateway may provide backhaul connection to a plurality of base stations located in a plurality of cell sites.

Figure 4:
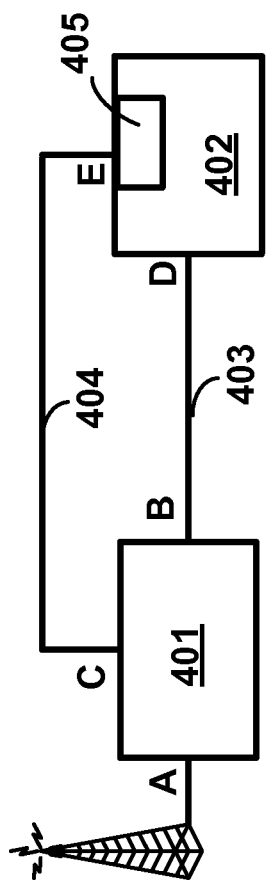
FIG. 4 is a simplified diagram depicting connections between a cell site gateway and a cellular network gateway according to an exemplary embodiment.

FIG. 4 is a simplified diagram depicting connections between a cell site gateway and a cellular network gateway according to an exemplary embodiment. In an example embodiment, the signaling peer may be adjacent with the cell site gateway in data plane. In an example embodiment, the signaling peer 405 may reside in in the packet network gateway 402. The signaling peer may exchange the control plane information with the packet network gateway via an internal interface. The signaling interface 404 may connect the cell site gateway 401 to the signaling peer 405 in the packet network gateway 402. The packet network gateway 402 may be connected to cell site gateway 401 via interface 403. The signaling peer and/or the cell site gateway may support outband MPLS signaling for label distribution or label switched path set up. In the case of out-band signaling, the interface 403 and 404 may be two separate physical interfaces, or they may be two separate signals on the same physical interface. For example, two different wavelengths in an optical interface, or packets transmitted in different formats on the same frequency. The signaling peer may also support in-band MPLS signaling for label distribution. In an example embodiment, interfaces 403 and 404 may be two different logical interfaces, e.g. one for data and the other one for signaling, and may transferred on the same physical port and physical link. There may be at least two logical ports on a physical port and enable interface 403 and 404. In another example embodiment, the signaling peer may not adjacent with the cell site gateway in data plane. The signaling peer may be a standalone node or a functional node integrated into another physical node.

Figure 5:
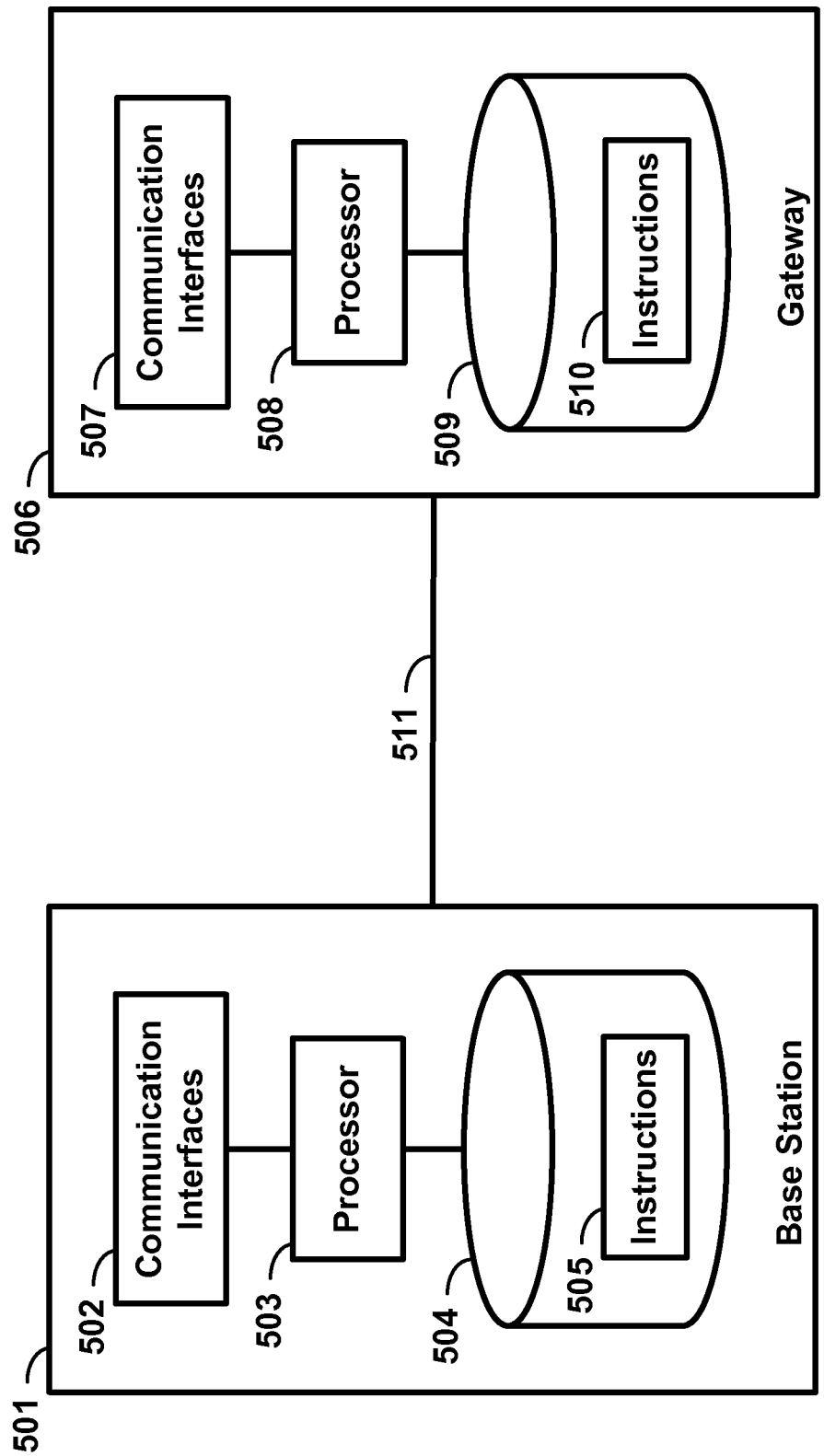
FIG. 5 is a block diagram of a base station and a cell site gateway according to an exemplary embodiment.

FIG. 5 is a block diagram of a base station 501 and a gateway 506 according to an exemplary embodiment. A communication network includes at least one base station 501 and at least one gateway 506. The base station 501 includes at least one communication interface 502, a processor 503, and program code instructions 505 that is stored in memory 504 and executable by processor 503. The gateway 506 includes at least one communication interface 507, a processor 508, and program code instructions 510 that is stored in memory 509 and executable by processor 508. Communication interface 502 in base station 501 may be configured to engage in a communication with communication interface 507 in the gateway 506 via a communication path that includes at least one digital link link 511. The digital link 511 is a bi-directional link. Communication interface 507 in the gateway 506 may also be configured to engage in a communication with communication interface 502 in the base station 501. The base station 501 and gateway 506 may be configured to send and receive data over the digital link 511. The communication interfaces 507 may include other interfaces for connecting to other nodes, such as packet network gateway. The communication interfaces 502 may include other interfaces for connecting to other nodes, such wireless interfaces for connection to wireless devices. Other alternatives in which a base station or cell site gateway includes multiple processors and multiple memories may also be implemented.

Figure 6:
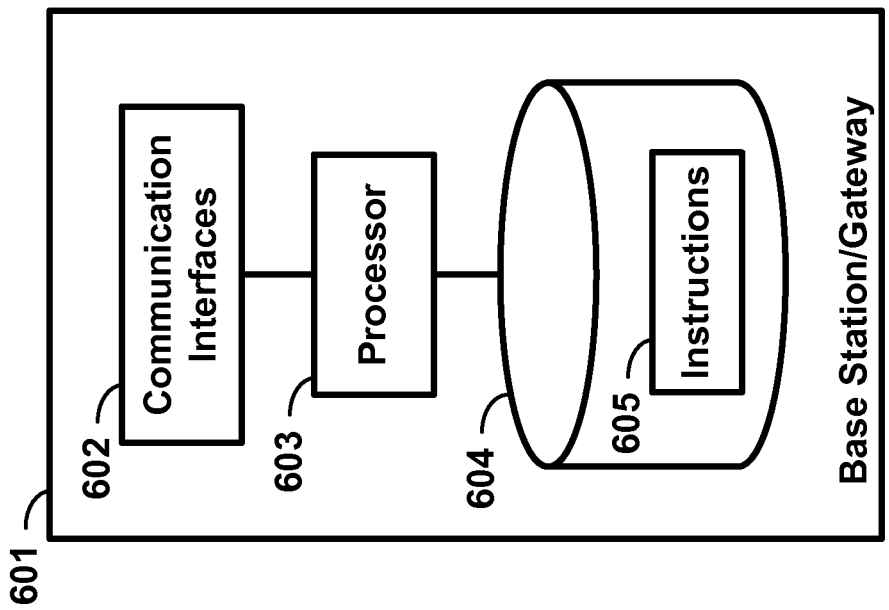
FIG. 6 is a block diagram of an integrated architecture for a base station and a cell site gateway according to an exemplary embodiment.

FIG. 6 is a block diagram of an integrated architecture for a base station and a cell site gateway according to an exemplary embodiment. The integrated base station and cell site gateway 601 includes at least one communication interface 602, a processor 603, and program code instructions 605 that is stored in memory 604 and executable by processor 603. Other alternatives in which a combined base station/cell site gateway includes multiple processors and multiple memories may also be implemented.

Figure 7:
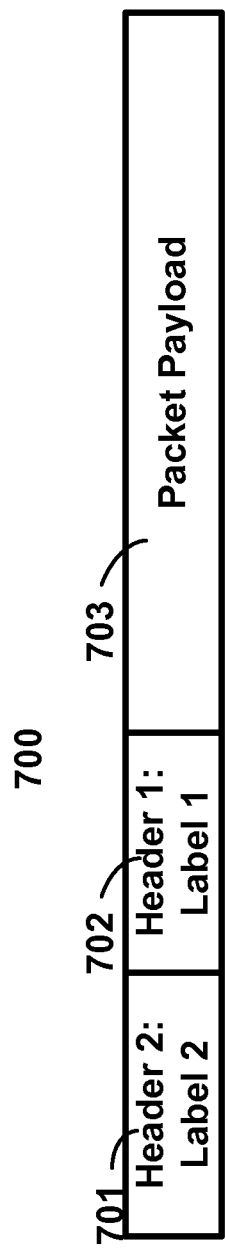
FIG. 7 depicts a packet payload and headers according to an exemplary embodiment.

FIG. 7 depicts a packet payload and headers according to an exemplary embodiment. The packet 700 comprises a packet payload 703. The packet payload 703 may include its own headers in an example embodiment. In one embodiment, the cell site gateway may add two headers to the packet. Header 2 including label 2 (701) may identify the flow, such as a pseudo-wire flow or an ATM or Ethernet flow, and another types of flow. Header 1 including label 1 (702) may identify a transmission port or path such as a label switched path.

A wireless network site may comprise a first base station and a cell site gateway. The first base station may communicate employing a wireless technology with at least one wireless device. The wireless technology may employ a protocol layer architecture comprising a physical layer supporting simultaneous transmission employing a plurality of antennae in each sector of the first base station. The first base station may communicate with a cellular network gateway through a cell site gateway. The cell site gateway may comprise a first interface, a second interface a third interface, and a packet forwarding layer. The first interface may be connected to the first base station. The second interface may be connected to a packet network gateway. The third interface may be connected to a signaling peer to exchange control plane information to program a forwarding layer. The first control plane information may be employed to create a plurality of flow entries comprising a first flow entry and a second flow entry. The first flow entry may comprise: a) a first match field for matching a first plurality of packets received from the packet network gateway; b) a first instruction field identifying at least one first instruction for processing the first plurality of packets. The second flow entry may comprise: a) a second match field for transmitting a second plurality of packets to the packet network gateway; b) a second instruction field identifying at least one second instruction for processing the second plurality of packets. The signaling peer may exchange second control plane information with the packet network gateway. The forwarding layer may transmit, to the first base station via the first interface. The first plurality of packets may be associated to the first flow entry if the first plurality of packets matches the first match field. The forwarding layer may transmit, to the packet network gateway via the second interface. The second plurality of packets associated to the second flow entry if the second plurality of packets matches the second match field.

The signaling peer may be, for example, an off-line management server, and/or an off-line network controller. The signaling peer may exchange information with the cell site gateway employing at least some of the following mechanisms: signaling mechanisms for hardware programming; signaling mechanism for forwarding tables; and/or signaling mechanism for device management and monitoring. The forwarding layer may drop a plurality packets if the plurality of packets do not match any match field in the plurality of flow entries. A flow entry may also include a priority for the packets, counters, time out value for aging the entries. The third interface may exchange control plane information employing a secure channel.

Cell site gateway, packet network gateway and cellular gateway may operate using open flow mechanism. Open flow equipment may comprise of one or more flow tables and a group table, which perform packet lookups and forwarding, and an open flow channel to an external controller. The switch may communicate with the controller and the controller may manage the switch via the open flow protocol. Using the open flow protocol, the controller may add, update, and delete flow entries in flow tables, both reactively (in response to packets) and proactively. Each flow table in the switch contains a set of flow entries; each flow entry may comprise of match fields, counters, and a set of instructions to apply to matching packets.

Matching may start at the first flow table and may continue to additional flow tables. Flow entries may match packets in priority order, with the first matching entry in each table being used. If a matching entry is found, the instructions associated with the specific flow entry are executed. If no match is found in a flow table, the outcome depends on configuration of the table-miss flow entry: for example, the packet may be forwarded to the controller over the open flow channel, dropped, or may continue to the next flow table.

Instructions associated with a flow entry either may contain actions or modify pipeline processing. Actions may be included in instructions describe packet forwarding, packet modification and group table processing. Pipeline processing instructions may allow packets to be sent to subsequent tables for further processing and allow information, in the form of metadata, to be communicated between tables. Table pipeline processing stops when the instruction set associated with a matching flow entry may not specify a next table; at this point the packet may be modified and forwarded.

Flow entries may forward to a port. This may be a physical port, but it may also be a logical port defined by the switch or a reserved port. Reserved ports may specify generic forwarding actions such as sending to the controller, flooding, or forwarding using non-open flow methods, such as "normal" switch processing, while switch-defined logical ports may specify link aggregation groups, tunnels or loopback interfaces. Actions associated with flow entries may also direct packets to a group, which specifies additional processing. Groups may represent sets of actions for flooding, as well as more complex forwarding semantics (e.g. multipath, fast reroute, and link aggregation). As a general layer of indirection, groups also enable multiple flow entries to forward to a single identifier (e.g. IP forwarding to a common next hop). This may allow common output actions across flow entries to be changed efficiently.

The group table may contain group entries. A group entry may contain a list of action buckets with specific semantics dependent on group type. The actions in one or more action buckets may be applied to packets sent to the group. Switch designers may implement the internals in any way convenient, provided that correct match and instruction semantics are preserved. For example, while a flow entry may use an all group to forward to multiple ports, a switch designer may choose to implement this as a single bitmask within the hardware forwarding table. Another example is matching; the pipeline exposed by an open flow switch may be physically implemented with a different number of hardware tables.

A Port may be where packets enter and exit the open flow pipeline. It may be a physical port, a logical port defined by the switch, or a reserved port defined by the open flow protocol. A pipeline may be a set of linked flow tables that provide matching, forwarding, and packet modifications in an open flow switch. A flow table may be a stage of the pipeline, contains flow entries. A flow entry may be an element in a flow table used to match and process packets. It may contain a set of match fields for matching packets, a priority for matching precedence, a set of counters to track packets, and a set of instructions to apply. A match field may be a field against which a packet is matched, including packet headers, the ingress port, and the metadata value. A match field may be wildcarded (match any value) and in some cases bitmasked. A metadata may be a maskable register value that is used to carry information from one table to the next. Instructions may be instructions that are attached to a flow entry and describe the open flow processing that happen when a packet matches the flow entry. An instruction either modifies pipeline processing, such as direct the packet to another flow table, or contains a set of actions to add to the action set, or contains a list of actions to apply immediately to the packet. An action may be an operation that forwards the packet to a port or modifies the packet, such as decrementing the TTL field. Actions may be specified as part of the instruction set associated with a flow entry or in an action bucket associated with a group entry. Actions may be accumulated in the action set of the packet or applied immediately to the packet. An action set may be a set of actions associated with the packet that are accumulated while the packet is processed by each table and that are executed when the instruction set instructs the packet to exit the processing pipeline. A group may be a list of action buckets and some means of choosing one or more of those buckets to apply on a per-packet basis. An action bucket may be a set of actions and associated parameters, defined for groups. A tag may be a header that may be inserted or removed from a packet via push and pop actions. An outermost tag may be the tag that appears closest to the beginning of a packet. A controller may be an entity interacting with the open flow switches using the open flow protocol. A meter may be a switch element that may measure and control the rate of packets. The meter may trigger a meter band if the packet rate or byte rate passing through the meter exceed a predefined threshold. If the meter band drops the packet, it may be called a rate limiter A flow table may comprise of flow entries. A flow table entry may contain match fields, priority, counter, instructions, timeouts, and/or cookies. Match fields may be for matching against packets. These may comprise of the ingress port and packet headers, and optionally metadata specified by a previous table. A priority may be for matching precedence of the flow entry. Counters may be updating/incrementing for a matching packet. Instructions may for modifying the action set or pipeline processing. Timeouts may be a maximum amount of time or idle time before flow a packet is expired by the switch. A cookie may be opaque data value chosen by the controller. It may be used by the controller to filter. A flow table entry may be identified by its match fields and priority.

Packet match fields may be extracted from the packet. Packet match fields may be used for table lookups and may depend on the packet type, and may include various packet header fields, such as Ethernet source address or IPv4 destination address. In addition to packet headers, matches may also be performed against the ingress port and metadata fields. Metadata may be used to pass information between tables in a switch. The packet match fields represent the packet in its current state, if actions applied in a previous table using the apply-actions changed the packet headers, those changes may be reflected in the packet match fields. A packet may match a flow table entry if the values in the packet match fields used for the lookup match those defined in the flow table entry. If a flow table entry field has a value of ANY (or field omitted), it may match all possible values in the header. If the switch supports arbitrary bitmasks on specific match fields, these masks may more precisely specify matches.

The packet is matched against the table and the highest priority flow entry that matches the packet may be selected. The counters associated with the selected flow entry may be updated and the instruction set included in the selected flow entry may be applied. If there are multiple matching flow entries with the same highest priority, the selected flow entry may be explicitly undefined. A flow table may support a table-miss flow entry to process table misses. The table-miss flow entry may specify how to process packets unmatched by other flow entries in the flow table, and may, for example send packets to the controller, drop packets or direct packets to a subsequent table. The table-miss flow entry may be identified by its match and its priority, it wildcards match fields (or all fields omitted) and may have the lowest priority (0). The match of the table-miss flow entry may fall outside the normal range of matches supported by a flow table, for example an exact match table would not support wildcards for other flow entries but may support the table-miss flow entry wildcarding all fields. The table-miss flow entry may not have the same capability as regular flow entry. Implementations may support for table-miss flow entries at minimum the same capability as the table-miss processing of previous versions of open flow: send packets to the controller, drop packets or direct packets to a subsequent table.

The table-miss flow entry may behave in most ways like any other flow entry: it does not exist by default in a flow table, the controller may add it or remove it at any time, and it may expire. The table-miss flow entry may match packets in the table as expected from its set of match fields and priority. It may match packets unmatched by other flow entries in the flow table. The table-miss flow entry instructions are applied to packets matching the table-miss flow entry. If the table-miss flow entry directly sends packets to the controller using a controller port, the packet-in reason may identify a table-miss. If the table-miss flow entry does not exist, by default packets unmatched by flow entries may be dropped (discarded). A switch configuration, for example using the open flow Configuration Protocol, may override this default and specify another behavior.

Counters may be maintained for each flow table, flow entry, port, queue, group, group bucket, meter and meter band, open flow-compliant counters may be implemented in software and maintained by polling hardware counters with more limited ranges. An example may contain the set of counters defined by the Open flow mechanism. Duration may refer to the amount of time the flow entry, a port, a group, a queue or a meter has been installed in the switch, and may be tracked with second precision. The receive errors field may be the total of receive and collision errors, as well as any others not called out. Counters may be unsigned and wrap around with no overflow indicator. If a specific numeric counter is not available in the switch, its value may be set to the maximum field value.

A flow entry may contain a set of instructions that are executed when a packet matches the entry. These instructions may result in changes to the packet, action set and/or pipeline processing. A switch may not be required to support all instruction types. The controller may also query the switch about which of the optional instruction it supports. The instruction set associated with a flow entry may contain a maximum of one instruction of each type. The instructions of the set may execute in the order specified by this above list. Constraints may be that the Meter instruction may be executed before the Apply-Actions instruction, the Clear-Actions instruction may be executed before the Write-Actions instruction, and that Goto-Table is executed last. A switch may reject a flow entry if it is unable to execute the instructions associated with the flow entry. In this case, the switch may return an unsupported flow error. Flow tables may not support every match, every instruction and every actions.

An action set may be associated with packets. This set may be empty by default. A flow entry may modify the action set using a Write-Action instruction or a Clear-Action instruction associated with a particular match. The action set may be carried between flow tables. When the instruction set of a flow entry does not contain a Goto-Table instruction, pipeline processing may stop and the actions in the action set of the packet are executed. An action set may contain a maximum of one action of each type. The set-field actions may be identified by their field types, therefore the action set may contain a maximum of one set-field action for each field type (i.e. multiple fields may be set). When multiple actions of the same type are required, e.g. pushing multiple MPLS labels or popping multiple MPLS labels, the Apply-Actions instruction may be used. In an example, the actions in an action set may be applied in the order specified below, regardless of the order that they were added to the set. If an action set contains a group action, the actions in the appropriate action bucket of the group are also applied in the order specified below. The switch may support arbitrary action execution order through the action list of the Apply-Actions instruction.

The output action in the action set may be executed last. If both an output action and a group action may be specified in an action set, the output action is ignored and the group action takes precedence. If no output action and no group action were specified in an action set, the packet is dropped. The execution of groups may be recursive if the switch supports it. A group bucket may specify another group, in which case the execution of actions traverses the groups specified by the group configuration.

In this specification, "a" and "an" and similar phrases are to be interpreted as "at least one" and "one or more."

Many of the elements described in the disclosed embodiments may be implemented as modules. A module is defined here as an isolatable element that performs a defined function and has a defined interface to other elements. The modules described in this disclosure may be implemented in hardware, software, firmware, wetware (i.e. hardware with a biological element) or a combination thereof, all of which are behaviorally equivalent. For example, modules may be implemented as a software routine written in a computer language (such as C, C++, Fortran, Java, Basic, Matlab or the like) or a modeling/simulation program such as Simulink, Stateflow, GNU Octave, or LabVIEW MathScript. Additionally, it may be possible to implement modules employing physical hardware that incorporates discrete or programmable analog, digital and/or quantum hardware. Examples of programmable hardware include: computers, microcontrollers, microprocessors, application-specific integrated circuits (ASICs); field programmable gate arrays (FPGAs); and complex programmable logic devices (CPLDs). Computers, microcontrollers and microprocessors are programmed employing languages such as assembly, C, C++ or the like. FPGAs, ASICs and CPLDs are often programmed employing hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) employing LTE communication network. However, one skilled in the art will recognize that embodiments of the invention may also be implemented in other communication systems, such as WiFi, WiMAX, or UMTS networks.

In addition, it should be understood that any figures which highlight the functionality and advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A wireless network site comprising:
    (a) a first base station, said first base station:
        (i) communicating employing a wireless technology with at least one wireless device, said wireless technology employing a protocol layer architecture comprising a physical layer supporting simultaneous transmission employing a plurality of antennae in each sector of said first base station; and
        (ii) communicating with a cellular network gateway through a cell site gateway; and
    (b) said cell site gateway, said cell site gateway comprising:
        (i) a first interface connected to said first base station;
        (ii) a second interface connected to a packet network gateway;
        (iii) a third interface connected to a signalling peer to exchange control plane information to program a forwarding layer, said control plane information comprising:
            (1) at least one first label value for receiving a first plurality of packets; and
            (2) at least one second label value for transmitting a second plurality of packets to said packet network gateway;
            wherein said signalling peer exchanges said control plane information with said packet network gateway; and
        (iv) said forwarding layer for:
            (1) transmitting said second plurality of packets to said packet network gateway employing said second interface;
            (2) receiving said first plurality of packets from said packet network gateway employing said second interface;
            (3) attaching at least one of said at least one second label to said second plurality of packets; and
            (4) removing at least one of said at least one first label from said first plurality of packets.

2. The wireless network site of claim 1, wherein said forwarding layer further comprises swapping label on a third plurality of packets.

3. The wireless network site of claim 1, wherein said cell site gateway comprises of a path computation engine.

4. The wireless network site of claim 1, wherein said cell site gateway exchanges said control plane information employing RSVP-TE via said third interface.

5. The wireless network site of claim 1, wherein said cell site gateway exchanges said control plane information employing MPLS-TP.

6. The wireless network site of claim 1, wherein said cell site gateway exchanges said control plane information employing a label distribution mechanism via said third interface.

7. The wireless network site of claim 1, wherein said cell site gateway comprises of routing functionality supporting a link state routing protocol.

8. A wireless network site comprising:
    (a) a first base station, said first base station:
        (i) communicating employing a wireless technology with at least one wireless device, said wireless technology employing a protocol layer architecture comprising a physical layer supporting simultaneous transmission employing a plurality of antennae in each sector of said first base station;
        (ii) communicating with a second base station through a first cell site gateway; and
        (iii) communicating with a cellular network gateway through said first cell site gateway; and
    (b) said first cell site gateway, said first cell site gateway comprising:
        (i) a first interface connected to said first base station;
        (ii) a second interface communicating:
            (1) with a packet network gateway; and
            (2) with said second base station through a second cell site gateway;
        (iii) a third interface connected to a signalling peer to exchange control plane information to program a forwarding layer, said control plane information comprising:
            (1) at least one first label value for receiving a first plurality of packets;
            (2) at least one second label value for transmitting a second plurality of packets to said packet network gateway; and
            (3) at least one parameter characterizing said second interface; and
        (iv) said forwarding layer for:
            (1) transmitting said second plurality of packets to said packet network gateway employing said second interface;
            (2) receiving said first plurality of packets from said packet network gateway employing said second interface;
            (3) attaching at least one of said at least one second label to said second plurality of packets; and
            (4) removing at least one of said at least one first label from said first plurality of packets.

9. The wireless network site of claim 8, wherein said forwarding layer further swaps at least one third label from a third plurality of packets forwarded to said second cell site gateway.

10. The wireless network site of claim 8, wherein said packet network gateway is connected to said cellular network gateway.

11. The wireless network site of claim 8, wherein said second plurality of packets are transmitted to said packet network gateway via at least one intermediate network node.

12. The wireless network site of claim 8, wherein said at least one first label and said at least one second label comprising:
    a) a label value;
    b) a class of service; and
    c) bottom of label stack flag.

13. The wireless network site of claim 8, wherein said cellular network gateway is an LTE Serving Gateway.

14. The wireless network site of claim 8, wherein said cellular network gateway is connected to an LTE Serving Gateway.

15. The wireless network site of claim 8, wherein said first base station forwards at least one of said first plurality packets received from said cell site gateway to said second base station during the handover procedure.

16. The wireless network site of claim 8, wherein said first base station forwards at least one of said first plurality of packets received from said cell site gateway to said first cell site gateway during the handover procedure.

17. A wireless network site comprising:
(a) a first base station, said first base station:
 (i) communicating employing a wireless technology with at least one wireless device, said wireless technology employing a protocol layer architecture comprising a physical layer supporting simultaneous transmission employing a plurality of antennae in each sector of said first base station; and
 (ii) communicating with a cellular network gateway through a cell site gateway; and
(b) said cell site gateway, said cell site gateway comprising:
 (i) a first interface connected to said first base station;
 (ii) a second interface connected to a packet network gateway;
 (iii) a third interface connected to a signalling peer to exchange control plane information to program a forwarding layer, said first control plane information employed to create a plurality of flow entries comprising:
  (1) a first flow entry comprising:
   (a) a first match field for matching a first plurality of packets received from said packet network gateway; and
   (b) a first instruction field identifying at least one first instruction for processing said first plurality of packets; and
  (2) a second flow entry comprising:
   (a) a second match field for transmitting a second plurality of packets to said packet network gateway; and
   (b) a second instruction field identifying at least one second instruction for processing said second plurality of packets;
 wherein said signalling peer exchanges second control plane information with said packet network gateway; and
 (iv) said forwarding layer for:
  (1) transmitting, to said first base station via said first interface, said first plurality of packets associated to said first flow entry if said first plurality of packets matches said first match field; and
  (2) transmitting, to said packet network gateway via said second interface, said second plurality of packets associated to said second flow entry if said second plurality of packets matches said second match field.

18. The wireless network site of claim 17, wherein said signaling peer is an off-line management server.

19. The wireless network site of claim 17, wherein said signaling peer is an off-line network controller.

20. The wireless network site of claim 17, wherein said signaling peer exchanges information with said cell site gateway employing the following:
a) signaling mechanisms for hardware programming;
b) signaling mechanism for forwarding tables; and
c) signaling mechanism for device management and monitoring.

* * * * *